United States Patent Office 3,301,328
Patented Jan. 31, 1967

3,301,328
WELL STIMULATION
Francis E. Campion, Tulsa, Okla., assignor, by mesne assignments, to Esso Production Research Company, Houston, Tex., a corporation of Delaware
No Drawing. Filed Nov. 1, 1963, Ser. No. 320,929
18 Claims. (Cl. 166—42)

The present invention relates to the production of crude oil from subterranean reservoirs and is particularly concerned with the use of surface active agents to stimulate production from reservoirs containing interstitial water in the vicinity of the production wells.

Field experience has shown that the accumulation of small quantities of water in the oil-bearing formations surrounding a producing well often results in the formation of a water block and that the accompanying decrease in oil production can sometimes be alleviated by the injection of a surface active agent which will lower the interfacial tension between the oil and water and change the wettability characteristic of the reservoir rock. Among the surface active agents which have been suggested as useful for this purpose are those disclosed in U.S. Patents 2,241,253 to Garrison, 2,246,726 to Garrison, 2,231,594 to Blair, 2,342,106 to Jones et al., 2,345,713 to Moore et al., 2,356,205 to Blair et al., 2,369,831 to Jones et al., 2,465,237 to Larsen, 2,779,418 to Garst, 2,800,962 to Garst, 2,851,105 to Garst, 2,865,453 to Widmyer, 2,874,779 to Johnson, 2,946,747 to Kirkpatrick et al., and 2,978,409 to Greenwald et al. Tests carried out with these materials have generally been disappointing. It has been found that most such agents are only useful under certain conditions and that in many cases they have little or no beneficial effect. The reasons for this behavior are not fully understood. Studies have indicated, however, that solubility effects, demulsification properties and other characteristics in addition to interfacial tension and wetting property must be taken into consideration and that most surface active materials lack the properties required for an effective well stimulation agent.

The present invention provides a new and improved method for stimulating oil production from zones partially or wholly blocked by interstitial water. In accordance with the invention, it has now been found that production from such zones can be increased significantly by treating the production wells with a mixture of anionic and nonionic surface active agents having critical properties and thereafter producing the injected solution and connate fluids from the formation. Tests have shown that the use of a combination of certain water-soluble and oil-soluble alkali metal sulfosuccinates and long chain polyethyleneoxyethanols in the proper proportions will overcome water blocking, emulsion blocking and related difficulties due to the presence of interstitial water and will generally permit improved production from oil bearing zones which do not respond significantly to the treating agents utilized for stimulation purposes in the past.

The combination of surface active agents employed in accordance with the invention is a three component mixture containing as its major constituent from about 50 to about 70% by volume of an alkali metal salt of a sulfonated diester of succinic acid having $C_8$ aliphatic ester groups. The sodium sulfosuccinates are particularly effective but the potassium, lithium and other alkali metal salts may also be used. Suitable compounds include di-n-octyl sodium sulfosuccinate, di-n-octenyl sodium sulfosuccinate, di(2-ethylhexyl) sodium sulfosuccinate, di(3-ethylhexyl) potassium sulfosuccinate, di(2-methylheptyl) lithium sulfosuccinate, di-n-octyl potassium sulfosuccinate, di-(2,2 - dimethylhexyl) sodium sulfosuccinate, di(2,2,4-trimethylpentyl) potassium sulfosuccinate, di-isooctyl sodium sulfosuccinate, di(1 - methylheptyl) potassium sulfosuccinate and the like. Di(2 - ethylhexyl) sodium sulfosuccinate is particularly effective and is preferred for purposes of the invention.

The second constituent of the mixture of surface active agents is an alkali metal salt of a sulfonated diester of succinic acid having $C_6$ aliphatic ester groups. Experimental work has shown that from about 20 to about 40 percent by volume of this second component is essential to secure proper distribution of the treating agent in an oil-water system and that neither sulfosuccinate is satisfactory for purposes of the invention in the absence of the other. Again the sodium salt is particularly effective, although the potassium, lithium and other alkali metal derivatives may be used. Suitable sulfosuccinates of this second type include di-n-hexyl sodium sulfosuccinate, di-n-hexenyl sodium sulfosuccinate, di(3-methylpentyl) potassium sulfosuccinate, di(2 - methylpentyl) lithium sulfosuccinate, di(2,2 - dimethyl butyl) potassium sulfosuccinate, di(2,3 - dimethyl butyl) sodium sulfosuccinate and the like.

The third constituent of the mixture of surface active agents employed for purposes of the invention is a long chain substituted polyethoxyethanol having the formula $R(C_6H_4)_YO(CH_2CH_2O)_ZCH_2CH_2OH$, where R is an aliphatic group containing X carbon atoms, X is an integer from 7 to 21, Y is 0 or 1, Z is an integer from 6 to 28, and $0.475X - 0.33(Z+1) = 0.4$ to $1.4$. The third component is employed in the mixture in a concentration of from about 5 to about 20 percent by volume. Tests have shown that this third component is essential if the extremely rapid emulsion breaking properties, good wetting characteristics and other requirements for a satisfactory agent are to be obtained. Examples of suitable compounds having the required structure include isooctyl phenyl polyethoxyethanol containing 9 to 10 moles of ethylene oxide per mole of isooctyl phenol, $C_{13}$ oxo polyethoxyethanol containing 15 to 16 moles of ethylene oxide per mole of $C_{13}$ oxo alcohol, nonyl phenyl polyethoxyethanol containing 9 to 10 moles of ethylene oxide per mole of nonyl phenol, eicosyl phenyl polyethoxyethanol containing 23 to 26 moles of ethylene oxide per mole of eicosyl phenol, isoheptyl polyethoxyethanol containing 5 to 6 moles of ethylene oxide per mole of isoheptyl alcohol and the like.

The three component mixture containing the constituents described in the preceding paragraph may be utilized for purposes of the invention in either an aqueous or a hydrocarbon solvent. Water base solutions of the mixture can be prepared by dissolving the constituents in propanol, isopropanol or a similar low molecular weight alcohol and thereafter adding the resultant alcoholic solution to water or brine in the desired concentration. Hydrocarbon solutions containing the mixture may be prepared by dissolving the surface active agent in a highly aromatic oil or petroleum fraction. The use of heavy aromatic naphtha containing from about 60 to about 90 percent aromatics has been found particularly effective. The concentration in which the mixture of surface active agents is utilized in the oil or water base solution will depend somewhat upon the intended application but will generally range between about 0.01 percent and about 5 percent by volume. For the treatment of wells to overcome existing water blocks and similar difficulties due to the presence of interstitial water, concentrations within the range between about 0.5 percent and about 2 percent by volume are preferred. Lower concentrations in the range between about 0.05 precent and about 0.5 percent by volume are satisfactory for the periodic treatment of wells to prevent the development of water blocks and related difficulties during future production.

The quantity of solution employed for the removal or prevention of water blocks and related difficulties caused by the presence of the interstitial water in the oil-bearing zone surrounding a production well will depend primarily upon the thickness of the zone to be treated. In general, the amount of solution utilized should range from about 50 to about 250 gallons per foot of formation thickness. Greater or lesser quantities may be employed in some cases, however, particularly where the concentration of surface active agents in the solution is in the upper or lower end of the concentration range specified above. The total amount of solution employed will normally range from about 100 to about 10,000 gallons or more per well.

The solution containing the mixed surface active agents is normally injected into the oil-bearing zone surrounding the well to be treated by first displacing oil and water present in the wellbore and then increasing the pressure sufficiently to force the material outwardly into the surrounding formation. An oil preflush or afterflush may be utilized if desired. Following the injection step, the solution is generally let stand in the formation for a period of from about 1 hour to about 36 hours. Thereafter, the pressure is reduced and the solution and connate fluids which flow back into the wellbore are pumped to the surface. Removal of the water block or similar difficulty is normally accompanied by immediate increase in the productivity of the well. Repeated treatments may be employed if desired but this is seldom necessary.

The process of the invention and the superiority of the treating agents employed in accordance therewith over agents utilized in the past can be seen by referring to the laboratory and field test results set forth in the following examples.

*Example 1*

The advantage of the mixture of surface active agents employed in accordance with the invention over the individual agents is shown by the results of demulsification tests carried out with a Libyan crude oil and two typical field brines. One of these brines, hereafter referred to as brine A, contained 19 weight percent sodium chloride, 10.4 weight percent calcium chloride, 5.34 weight percent magnesium sulfate as $MgSO_4 \cdot 7H_2O$, 3.05 weight percent magnesium chloride, and trace quantities of sodium bicarbonate. Brine B contained 2 weight percent sodium chloride and 0.2 weight percent calcium chloride. Four emulsion samples were prepared with the Libyan crude oil and each of these brines by mixing equal parts of oil and brine and stirring the resultant mixtures at high speed for three minutes with a mechanical stirrer. Each of the samples thus prepared was then treated with 0.5% by volume of a surface active agent. The volume of water, emulsion and oil present in each sample at the end of 30 minutes was measured. The treating agents employed and the results obtained are shown in the following table.

TABLE I.—DEMULSIFICATION OF LIBYAN CRUDE OIL-BRINE EMULSIONS

| Treating Agent | Percent Water, Emulsion and Oil After 30 Minutes | |
|---|---|---|
| | Brine A | Brine B |
| 0.5 vol. percent dioctyl sodium sulfosuccinate | 50, W; 0, E; 50, O. | 5, W; 95, E; 0; O. |
| 0.5 vol. percent dihexyl sodium sulfosuccinate | 0, W; 94, E; 6, O. | 50, W; 0, E; 50, O. |
| 0.5 vol. percent isooctylphenyl polyethyleneoxyethanol with 10 moles ethylene oxide per mole of isooctyl phenol. | 31, W; 20, E; 49, O. | 35, W; 18, E; 47, O. |
| 0.5 vol. percent of mixture of 60 vol. percent dioctyl sodium sulfosuccinate, 30 vol. percent dihexyl sodium sulfosuccinate, 10 vol. percent isooctylphenyl polyethyleneoxyethanol with 10 moles ethylene oxide per mole of isooctyl phenol. | 50, W; 0, E; 50, O. | 50, W; 0, E; 50, O. |

The data set forth in the above table show that the brine present in the emulsion had a pronounced effect upon the action of the surface active agents. Neither of the sulfosuccinates alone was effective with both brines. Even where complete demulsification with a single agent was obtained, the glassware in which the tests were carried out was dirty and thus indicated that the agent had poor wetting properties. The blend of three agents rapidly broke the emulsions in both the light and heavy brine and left no traces of oil or sludge on the glassware. These results show that the mixed agent can be employed in the presence of either light or heavy brines and that it has much better demulsification properties than any of the individual constituents.

*Example 2*

Following the above described demulsification tests, additional experiments were carried out to evaluate further the wetting characteristics of the mixture of surface active agents and the individual constituents used therein. These tests were conducted by first cleaning standard microscope slides with chromic acid and then rinsing off the acid to render the slide surfaces preferentially water-wet. The slides were then dried. Glass cylinders were partially filled with the field brines described in the preceding example and the Libyan crude oil employed above was then poured into the cylinders above the brine to establish a water-oil interface in each cylinder. The clean dry slides were immersed in the oil layer in each cylinder and held there for a period of 30 minutes. At the end of this time, the slides were lowered into the brine below the oil and allowed to stand for 30 minutes. The percentage of the slide surface which was covered with oil at the end of the 30 minute brine immersion was then measured. Tests were carried out with and without surface active agents in the oil phase. The results of these tests are set forth below.

TABLE II.—WETTING CHARACTERISTICS OF SURFACE ACTIVE AGENTS

| Treating Agent in Oil Phase | Percent of Slide Surface Oil Wet After 30 Minutes | |
|---|---|---|
| | Brine A | Brine B |
| None | 100 | 100 |
| 0.1 vol. percent dioctyl sodium sulfosuccinate | 90 | 75 |
| 0.1 vol. percent dihexyl sodium sulfosuccinate | 30 | 10 |
| 0.1 vol. percent isooctyl phenyl polyethyleneoxyethanol with 10 moles ethylene oxide per mole of isooctyl phenol | 75 | 50 |
| 0.1 vol. percent of mixture of 60 vol. percent dioctyl sodium sulfosuccinate, 30 vol. percent dihexyl sodium sulfosuccinate, 10 vol. percent isooctyl phenyl polyethyleneoxyethanol with 10 moles ethylene oxide per moles of isooctyl phenol | 10 | 10 |

It can be seen from the above table that the slides tested without a surface active agent remained oil-wet after immersion in the Libyan crude oil, regardless of the composition of the brine with which the slides were subsequently contacted. With the individual surface active agents, the oil coverage ranged from 10 to 90 percent of the slide surface. The oil wetting was more pronounced with the heavy brine than with brine B. With the blend of surface active agents, the oil wet surface after 30 minutes was only about 10% of the slide surface in both cases. These data show that the blend of agents altered the wettability of the surfaces more effectively than did the individual constituents. This is in part responsible for the improved performance of the blend.

*Example 3*

To further test the demulsifying characteristics of the treating agent of the invention, additional experiments were carried out with emulsions produced by mixing equal parts of a heavy crude oil and a brine containing salts in a concentration of 200,000 parts per million. Earlier work has shown that this crude oil forms particularly stable emulsions and that water blocking is a common problem in the wells from which it is produced. The brine employed is similar to the field brine. The emulsion thus produced was treated with 0.1% by volume of a treating agent prepared by blending equal parts by volume of dioctyl sodium sulfosuccinate and dihexyl sodium sulfosuccinate in a heavy aromatic naphtha containing about 75% aromatics. Upon addition of the treating agent, water began to separate from the emulsion immediately. After about 15 minutes, the rate of water separation had decreased appreciably. At the end of 30 minutes, an emulsion containing about 4% of the oil and about 30% of the brine remained.

Following the above test, a second treating agent was prepared by blending 60% by volume of dioctyl sodium sulfosuccinate, 30% by volume of dihexyl sodium sulfosuccinate, and 10% by volume of isooctyl phenyl polyethyleneoxyethanol containing about 9 moles of ethylene oxide per mole of isooctylphenol into aromatic naphtha so that the total surface active agent concentration was 10%. This agent was added to a fresh emulsion of the crude oil and brine employed above to give a surfactant concentration about the same as that used earlier. It was found that the emulsion was completely broken in less than 5 minutes. The glassware employed was very clean, indicating good wetting properties. These results demonstrate that the three component blend of surface active agents is surprisingly more effective as a demulsifying agent than the two component blend omitting the alkyl phenyl polyethyleneoxyethanol.

*Example 4*

Tests similar to those described above were carried out by preparing three samples containing equal parts of heavy aromatic naphtha and a brine having a salt content of 200,000 parts per million. A surface active agent was added to each sample in a concentration of 0.1% by weight. The agent added to the first sample consisted of equal parts of dioctyl sodium sulfosuccinate and dihexyl sodium sulfosuccinate. That used in the second sample was composed of 83.3% dioctyl sodium sulfosuccinate and 16.7% isooctylphenyl polyethyleneoxyethanol containing about 10 moles of ethylene oxide per mole of isooctyl phenol. The agent incorporated into the third sample consisted of 60% dioctyl sodium sulfosuccinate, 30% dihexyl sodium sulfosuccinate, and 10% of the isooctylphenyl polyethyleneoxyethanol containing about 10 moles of ethylene oxide per mole of isooctyl phenol. The three samples were shaken vigorously to cause emulsification and were then allowed to stand. All of the emulsions broke completely within about 30 minutes. A heavy crude oil was then added to each of the samples in a concentration of 50%, based on the initial sample volume. The samples were again shaken vigorously to form emulsions and the rate at which the emulsions broke was observed. The results are set forth in the following table.

TABLE III.—TESTS OF CANADIAN CRUDE OIL

| Elapsed Time, Minutes | Percent Water Separated from Emulsion | | |
|---|---|---|---|
| | Sample 1[1] | Sample 2[2] | Sample 3[3] |
| 0 | 0 | 0 | 0 |
| 2 | 56 | 0 | 40 |
| 4 | 64 | 0 | 80 |
| 5 | 68 | 0 | 100 |
| 10 | 80 | 8 | 100 |
| 17 | 92 | 36 | 100 |
| 25 | 92 | 84 | 100 |
| 35 | 96 | 92 | 100 |
| 55 | 100 | 100 | 100 |

[1] Sample 1 contained 50% dioctyl sodium sulfosuccinate and 50% dihexyl sodium sulfosuccinate.
[2] Sample 2 contained 83.3% dioctyl sodium sulfosuccinate and 16.7% isooctylphenyl polyethyleneoxyethanol.
[3] Sample 3 contained 60% dioctyl sodium sulfosuccinate, 30% dihexyl sodium sulfosuccinate, and 10% isooctylphenyl polyethyleneoxyethanol.

Again it can be seen that the three component mixture formulated in accordance with the invention was much more effective for breaking the emulsions than systems containing only two components. The agents employed in samples 1 and 2 both required over ten times as long to completely break the emulsion as did the agent employed in sample 3.

*Example 5*

Further demulsification tests were carired out with five different Venezuelan crude oils and a synthetic brine containing 1% sodium chloride. Equal quantities of each of the crude oils and the brine were mixed and stirred for 30 minutes at high speed. Eight equal samples of each of the resulting emulsions were prepared. Seven commercial surface active agents marketed for use in overcoming water blocks and an agent prepared in accordance with the invention were used to treat these samples. In each case a 10% solution of the surface active agent in heavy aromatic naphtha was added to give a surfactant concentration of 0.1% by volume. The amount of water which had separated from each of the emulsions was measured at periodic intervals. The results are set forth in the following table.

TABLE IV.—TESTS OF VENEZUELAN CRUDE OILS

| Time | Percent Water Separated from Emulsion | | | | | | | | |
|---|---|---|---|---|---|---|---|---|---|
| | Blank | Agent of the Invention* | Commercial Agent A | Commercial Agent B | Commercial Agent C | Commercial Agent D | Commercial Agent E | Commercial Agent F | Commercial Agent G |
| Crude Oil A: | | | | | | | | | |
| 5 min | 0 | 100 | 20 | 0 | 60 | 10 | 0 | 0 | 60 |
| 30 min | 0 | | 60 | 60 | 100 | 20 | 30 | 10 | 100 |
| 1 hr | 0 | | 100 | 70 | | 20 | 40 | 10 | |
| 2 hrs | 0 | | | 80 | | 30 | 44 | 20 | |
| Overnight | 0 | | | 100 | | 100 | 100 | 100 | |
| Crude Oil B: | | | | | | | | | |
| 5 min | 0 | 100 | 0 | 10 | 30 | 0 | 0 | 0 | 30 |
| 30 min | 0 | | 0 | 50 | 70 | 10 | 0 | 0 | 100 |
| 1 hr | 0 | | 10 | 70 | 100 | 40 | 0 | 0 | |
| 2 hrs | 0 | | 40 | 100 | | 50 | 0 | 10 | |
| Overnight | 100 | | 100 | | | 100 | 0 | 30 | |
| Crude Oil C: | | | | | | | | | |
| 5 min | 0 | 100 | 100 | 100 | 100 | 100 | 100 | 40 | 100 |
| 2 hrs | 10 | | | | | | | 100 | |
| Overnight | 20 | | | | | | | | |
| Crude Oil D: | | | | | | | | | |
| 5 min | 0 | 0 | 0 | 0 | 0 | 0 | 0 | 0 | 0 |
| 30 min | 0 | 20 | 20 | 0 | 0 | 0 | 20 | 0 | 0 |
| 1 hr | 0 | 20 | 20 | 0 | 0 | 0 | 30 | 0 | 0 |
| 2 hrs | 0 | 20 | 20 | 0 | 0 | 0 | 30 | 0 | 10 |
| Overnight | 0 | 30 | 20 | 0 | 10 | 0 | 30 | 0 | 30 |
| Crude Oil E: | | | | | | | | | |
| 5 min | 0 | 0 | 0 | 0 | 0 | 0 | 0 | 0 | 0 |
| 30 min | 0 | 20 | 0 | 0 | 0 | 0 | 0 | 0 | 20 |
| 1 hr | 0 | 24 | 0 | 0 | 0 | 0 | 0 | 0 | 30 |
| 2 hrs | 0 | 34 | 0 | 0 | 0 | 0 | 10 | 0 | 34 |
| Overnight | 0 | 80 | 0 | 0 | 20 | 0 | 20 | 0 | 40 |

*A mixture of 60% dioctyl sodium sulfosuccinate, 30% dihexyl sodium sulfosuccinate, and 10% isooctylphenyl polyethylene oxyethanol with 9–10 moles of ethylene oxide per mole of isooctyl phenol.

The above data demonstrate that the treating agent of the invention was far more effective for breaking emulsions than the commercial agents marketed for oil field applications. The data also emphasize the differences in the emulsification properties of various crude oils. Oils D and E formed particularly difficult emulsions which were not completely broken by any of the treating agents during the test period. The agent of the invention was as effective as any of the commercial agents for breaking the emulsions formed with oil D. It was considerably more effective than any of the commercial agents with respect to the emulsions formed with oil E. The superiority of the mixed surfactant of the invention over the commercial agents is thus apparent.

*Example 6*

Other demulsification tests were carried out with a crude oil from Peru. Samples of the oil were emulsified with a 2.2% brine and 1% of a surfactant. After rapidly mixing each sample for a period of 2 minutes, the samples were allowed to stand and the volumes of the oil phase, the water phase, and the emulsion were measured. The results obtained with a commercial surface active agent marketed for well treating purposes, with the treating agent of the invention, and with a similar agent containing the same constituents in different proportions are set forth in the following table.

TABLE V.—TESTS OF PERUVIAN CRUDE OIL

| Elapsed Time | Volumes of Water, Emulsion and Oil Phases | | | |
|---|---|---|---|---|
| | Blank, W–E–O | Sample A,[1] W–E–O | Sample B,[2] W–E–O | Sample C,[3] W–E–O |
| 0 | 0-100-0 | 0-100-0 | 0-100-0 | 0-100-0 |
| 5 min | 0-100-0 | 45-5-50 | 45-18-37 | 50-0-50 |
| 30 min | 0-100-0 | 45-5-50 | 45-9-46 | |
| Overnight | 0-100-0 | 45-5-50 | 50-0-50 | 0 |

[1] Sample A—Commercial surface active agent.
[2] Sample B—Mixture of 44.5% dioctyl sodium sulfosuccinate, 44.5% dihexyl sodium sulfosuccinate, and 11% isooctylphenyl polyethyleneoxyethanol containing 9 to 10 moles of ethylene oxide per mole of isooctyl phenol.
[3] Sample C—Mixture of 60% dioctyl sodium sulfosuccinate, 30% dihexyl sodium sulfosuccinate, and 10% isooctyl phenyl polyethyleneoxyethanol containing 9 to 10 moles of ethylene oxide per mole of isooctyl phenol.

The above data again demonstrate the surprising effectiveness of the treating agent of the invention. No separation of the emulsion occurred in the blank sample. The commercial agent and sample B containing the dioctyl sodium sulfosuccinate, dihexyl sodium sulfosuccinate and isooctyl phenyl polyethyleneoxyethanol in proportions different from those required for purposes of the invention both acted very slowly. Complete separation was not obtained with the commercial agent. The agent of the invention, on the other hand, completely broke the emulsion within a five minute period. It can thus be seen that the proportions in which the constituents are employed are critical and that mixtures of surface active agents not containing constituents in the proper proportions are ineffective for purposes of the invention.

*Example 7*

Still another demulsification test utilizing an extremely viscous Venezuelan crude oil was carried out. An emulsion of the highly viscous oil was prepared by adding a 1% brine to the oil while stirring it at high speed. Equal quantities of brine and oil were used. Surface active agents were added to four samples of the resulting emulsion in a concentration of 0.1% by volume and the samples were then allowed to stand overnight. About 30% of the sample containing 60% dioctyl sodium sulfosuccinate, 30% dihexyl sodium sulfosuccinate and 10% isooctylphenyl polyethyleneoxyethanol with 9 moles of ethylene oxide per mole of isooctyl phenol separated. There was no perceptible separation of the emulsion in a blank sample, or in any of the samples containing three different treating agents marketed commercially as well treating surfactants and recommended by the manufacturers for overcoming water blocking problems. Again the treating agent of the invention was much more effective than commercial agents marketed for breaking emulsions of crude oil and connate water.

*Example 8*

The demulsification properties of the treating agent of the invention and three commercial treating agents marketed in Canada for treating water blocked wells were tested with seven Canadian crude oils and a brine containing 8% sodium chloride and 1.75% calcium chloride. Emulsions were prepared by mixing the crude oils and brine in equal parts and stirring them together at high speed for two minutes. The treating agents were added to separate samples of the resulting emulsions in concentrations of 1% by volume. The samples were allowed to stand and the volume of water, emulsion and oil in each was measured at periodic intervals. The results are set forth in the table below.

TABLE VI.—TREATMENT OF CANADIAN OIL EMULSIONS

| Elapsed Time | Volumes of Water, Emulsion and Oil Phases | | | | | | |
|---|---|---|---|---|---|---|---|
| | Oil #1, W–E–O | Oil #2, W–E–O | Oil #3, W–E–O | Oil #4, W–E–O | Oil #5, W–E–O | Oil #6, W–E–O | Oil #7, W–E–O |
| Commercial Treating Agent A: | | | | | | | |
| 0 | 0-100-0 | 0-100-0 | 0-100-0 | 0-100-0 | 0-100-0 | 0-100-0 | 0-100-0 |
| 5 min | 43-20-37 | 47-4-49 | 50-0-50 | 46-10-44 | 46-4-48 | 50-0-50 | 48-5-47 |
| 30 min | 45-7-48 | 48-4-48 | | 46-6-48 | 50-0-50 | | 50-0-50 |
| 1 hr | 50-0-50 | 50-0-50 | | 50-0-50 | | | |
| Commercial Treating Agent B: | | | | | | | |
| 0 | 0-100-0 | 0-100-0 | 0-100-0 | 0-100-0 | 0-100-0 | 0-100-0 | 0-100-0 |
| 5 min | 3-93-4 | 0-98-2 | 0-95-5 | 3-96-1 | 4-94-2 | 4-94-2 | 6-94-0 |
| 30 min | 18-76-6 | 18-74-8 | 14-79-7 | 17-79-4 | 19-76-5 | 18-75-7 | 12-64-24 |
| 1 hr | 33-56-12 | 31-57-12 | 27-63-10 | 27-67-6 | 32-61-7 | 31-61-7 | 38-52-10 |
| 2 hrs | 37-47-16 | 35-53-12 | 33-55-12 | 35-55-10 | 37-51-12 | 40-41-19 | 38-49-13 |
| Overnight | 48-4-48 | 46-7-47 | 46-6-48 | 47-4-49 | 49-2-49 | 46-13-41 | 46-11-43 |
| Commercial Treating Agent C: | | | | | | | |
| 0 | 0-100-0 | 0-100-0 | 0-100-0 | 0-100-0 | 0-100-0 | 0-100-0 | 0-100-0 |
| 5 min | 9-74-17 | 8-81-11 | 4-93-3 | 5-87-8 | 5-90-5 | 4-93-3 | 9-72-19 |
| 30 min | 42-13-45 | 42-10-48 | 42-10-48 | 44-7-49 | 44-10-46 | 27-43-30 | 37-31-32 |
| 1 hr | 45-9-46 | 45-7-48 | 45-6-49 | 46-5-49 | 47-7-46 | 42-15-43 | 44-14-42 |
| 2 hrs | 46-6-48 | 48-3-49 | 46-5-49 | 48-3-49 | 48-3-49 | 45-11-43 | 46-8-46 |
| Overnight | 50-0-50 | 50-0-50 | 50-0-50 | 50-0-50 | 50-0-50 | 43-3-49 | 50-0-50 |
| Agent of the Invention:* | | | | | | | |
| 0 | 0-100-0 | 0-100-0 | 0-100-0 | 0-100-0 | 0-100-0 | 0-100-0 | 0-100-0 |
| 5 min | 50-0-50 | 50-0-50 | 50-0-50 | 50-0-50 | 50-0-50 | 50-0-50 | 50-0-50 |

*Mixture of 60% dioctyl sodium sulfosuccinate, 30% dihexyl sodium sulfosuccinate, 10% isooctylphenyl polyethyleneoxyethanol containing 9 to 10 moles ethylene oxide per mole of isooctyl phenol.

The data above show that none of the commercial surface active agents broke the crude oil-brine emulsions effectively. In most cases demulsification occurred only after the samples had stood overnight. The three conponent agent of the invention, on the other hand, rapidly broke the emulsions in each case. The average time required for complete separation of the water and oil with the material of the invention was substantially less than 5 minutes and averaged about 2 to 3 minutes.

*Example 9*

Another test was carried out with five other Canadian crude oils and a field brine. Emulsion samples produced by vigorous agitation of equal parts of the brine and each of the crude oils were tested with a commercial surface active agent marketed for use in well treating operations and with an agent containing 60% dioctyl sodium sulfosuccinate, 30% dihexyl sodium sulfosuccinate and 10% isooctyl phenyl polyethyleneoxyethanol having 9 to 10 moles of ethylene oxide per moles of isooctyl phenol. Both the commercial surface active agent and the agent of the invention were employed in 1% concentrations in aromatic solvent. As shown in the following table, the agent of the invention broke the emulsion in each of the samples almost immediately; whereas use of the commercial agent resulted in complete separation of the oil and brine in only two instances.

tion of the invention is a more effective surface active agent in the Libyan crude oil than either of the commercial materials.

*Example 11*

Following the tests described above, core tests were carried out using the treating agent of the invention in concentrations of 0.05% by volume and 0.1% by volume. The cores employed were first saturated with a brine containing dissolved solids in a concentration of about 200,000 parts per million. This brine was then displaced with a refined oil to establish an oil-water saturation. The core was then backflowed with two pore volumes of heavy aromatic naphtha containing 0.05% of a surfactant mixture composed of 50% dioctyl sodium sulfosuccinate, 30% dihexyl sodium sulfosuccinate and 10% isooctyl phenyl polyethyleneoxyethanol. The injected surfactant solution was displaced with additional oil. Measurements of the permeability to oil following the initial saturation of the core with the oil and water and after treatment with the surfactant solution showed that the use of the treating agent improved the core permeability by 5.8%. A similar improvement was obtained when the treating agent was used in a concentration of 0.1% in heavy aromatic naphtha. When the treating agent was allowed to remain in the core overnight, the permeability to oil increased by 12.7%. Treatment with

TABLE VII. DEMULSIFICATION OF CANADIAN OILS AND FIELD BRINE

| Elapsed Time | Volumes of Water, Emulsion and Oil | | | | |
|---|---|---|---|---|---|
| | Oil #1, W-E-O | Oil #2, W-E-O | Oil #3, W-E-O | Oil #4, W-E-O | Oil #5, W-E-O |
| Commercial Agent: | | | | | |
| 0 | 0-100-0 | 0-100-0 | 0-100-0 | 0-100-0 | 0-100-0 |
| 5 min | 10-55-35 | 20-35-45 | 20-35-45 | 15-45-40 | 15-50-35 |
| 1 hr | 20-35-45 | 25-25-50 | 25-27-48 | 20-35-45 | 25-25-50 |
| 2 hrs | 30-20-50 | 35-15-50 | 35-15-50 | 25-25-50 | 40-10-50 |
| Overnight | 45-5-50 | 45-5-50 | 50-0-50 | 40-10-50 | 50-0-50 |
| Agent of the Invention:* | | | | | |
| 0 | 0-100-0 | 0-100-0 | 0-100-0 | 0-100-0 | 0-100-0 |
| 5 min | 50-0-50 | 50-0-50 | 50-0-50 | 50-0-50 | 50-0-50 |

*A mixture of 60% dioctyl sodium sulfosuccinate, 30% dihexyl sulfosuccinate, 10% isooctyl phenyl polyethyleneoxyethanol with 9 to 10 moles ethyleneoxide per mole of isooctyl phenol.

*Example 10*

In order to further test the agent of the invention, the interfacial tensions between samples of a Libyan crude oil containing three different surface active agents in concentrations of 0.1% and a brine containing salts in a concentration of 200,000 parts per million were measured. The measurments were made with a Du Nouy tensiometer. Two measurements were made with each sample, one with the ring moving up and the other with the ring moving down. The results obtained are shown below.

TABLE VIII

| Agent | Interfacial Tension | |
|---|---|---|
| | Up | Down |
| Commercial Agent A | 15.0 | 14.6 |
| Commercial Agent B | 14.1 | 13.0 |
| Mixture of 60% dioctyl sodium sulfsuccinate, 30% dihexyl sodium sulfosuccinate and 10% isooctylphenyl polyethyleneoxyethanol | 2.6 | 2.8 |

It will be seen from the above table that the interfacial tension with the oil containing the surface active composition of the invention was much lower than that obtained when the commercial treating agents were employed. This lower interfacial tension indicates that the composiexcess water following use of the surfactant did not result in invert emulsion problems. These data show that the treating agent can be used in porous media and that it permits substantial increases in the permeability to oil where interstitial water is present.

*Example 12*

Four producing wells completed over similar intervals at the flank of an oil field subject to a natural water drive were treated with surface active agents to overcome water blocking problems and thus stimulate oil production. The treating agent used in three of the wells was a commercial surface active agent which is recommended by the manufacturer for stimulating water blocked wells and was selected as the most promising of the commercial agents available. The fourth well was treated with a mixture of 60 volume percent of dioctyl sodium sulfosuccinate, 30 volume percent of dihexyl sodium sulfosuccinate and 10 volume percent of isooctylphenyl polyethyleneoxyethanol containing 10 moles of ethylene oxide per mole of isooctyl phenol. Both the commercial surface active agent and the mixed agent were used in a concentration of 1 percent by volume in a heavy aromatic naphtha containing about 80% aromatics. All of the wells were treated at the rate of 100 gallons per foot of exposed interval. The treatment was carried out in each case by first displacing crude oil and water present in the wellbore and thereafter injecting the surface active agent solution under sufficient pressure to force it outwardly into the surrounding formation. The injected solution was allowed to stand in the formation for a period of 24 hours. At the end of this period, the solution and connate fluids were produced by backflowing the well and then putting it on production. The results of these treatments, as indicated by productivity measurements before and after the treatment, are seat forth in Table IX.

TABLE IX.—COMPARISON OF FIELD RESULTS

| Well No. | Treating Agent | Average Oil Rate, bbls./month | | |
|---|---|---|---|---|
| | | 6 months before treatment | 3 months after treatment | At end of 3 months period |
| 1 | Commercial Agent | 496 | 595 | 311 |
| 2 | Commercial Agent | 381 | 457 | 365 |
| 3 | Commercial Agent | 890 | 683 | 684 |
| 4 | Mixed Agent* | 610 | 739 | 715 |

*Mixture of 60% dioctyl sodium sulfosuccinate, 30% dihexyl sodium sulfosuccinate, and 16% isooctylphenyl polyethyleneoxyethanol containing 10 moles of ethylene oxide per mole of isooctyl phenol.

It can be seen from the table above that the commercial treating agent produced an increase in the average oil rate from wells 1 and 2 during the three months period following the treatment. At the end of this period, however, both wells were producing somewhat less oil than they had averaged during the six months period preceding the treatment. The benefits obtained thus lasted only a short time. In the case of well 3, the production rate following use of the commercial agent was considerably lower than it had been before the treatment and hence the commercial agent apparently had an adverse effect. The agent of the invention, on the other hand, resulted in a sustained increase in production from well 4. At the end of the three months period following the treatment, the production rate was still nearly 100 barrels per month greater than it had been prior to treatment. These data clearly demonstrate the surprising effectiveness of the agent of the invention and emphasize its superiority over commercial agents recommended for well treating applications heretofore.

*Example 13*

A water blocked well is treated to increase oil production by injecting a heavy aromatic naphtha containing 1.5 percent by volume of a treating agent composed of 65% dioctyl potassium sulfosuccinate, 20% dihexyl potassium sulfosuccinate, and 15% nonylphenyl polyethyleneoxyethanol prepared with 10 moles of ethylene oxide per mole of nonyl phenol. The naphtha is injected into the formation surrounding the well at the rate of about 125 gallons per foot of exposed producing interval. After the injected solution has stood for about 12 hours, the well is backflowed to remove the solution, oil and connate water.

*Example 14*

Difficulties due to the presence of interstitial water in the producing formation surrounding a wellbore are alleviated by treating the formation with a naphtha containing 0.5 percent by volume of a treating agent consisting of 50% dioctyl lithium sulfosuccinate, 30% dihexyl lithium sulfosuccinate, and 20% $C_{13}$ oxo polyethyleneoxyethanol containing 16 moles of ethylene oxide per mole of $C_{13}$ oxo alcohol.

*Example 15*

The oil production rate from a well damaged by an aqueous fluid during workover operations is improved by preflushing the formation with crude oil, injecting a naphtha containing 1% by volume of a mixture of 65% by volume of dioctyl sodium sulfosuccinate, 30% by volume of dihexyl sodium sulfosuccinate and 5% by volume of octadecylphenyl polyethyleneoxyethanol containing 21 moles of ethylene oxide per mole of octadecyl phenol, and thereafter backflowing the well.

It will be apparent from the above examples that the treating agent of the invention possesses excellent demulsification properties and other characteristics which make it particularly useful for overcoming water blocking and similar difficulties. The agent may also be employed in acid treating solutions, fracturing operations and other applications where such characteristics are required.

What is claimed is:

1. A method for treating a subterranean oil-bearing formation surrounding a wellbore which comprises injecting into said formation through said wellbore a solvent containing from about 0.01 to about 5 percent by volume of a mixture of from about 50 to 70 percent by volume of an alkali metal salt of a diester of sulfosuccinic acid having $C_8$ aliphatic ester groups, from about 20 to about 40 percent by volume of an alkali metal salt of a diester of sulfosuccinic acid having $C_6$ aliphatic ester groups, and from about 5 to about 20 percent by volume of a long chain substituted polyethyleneoxyethanol having the formula $R(C_6H_4)_YO(CH_2CH_2O)_ZCH_2CH_2OH$, where R is an aliphatic group containing X carbon atoms, X is an integer from 7 to 21, Y is 0 or 1, Z is an integer from 6 to 28, and $0.475X - 0.33(Z+1) = 0.4$ to $1.4$.

2. A method as defined by claim 1 wherein said alkali metal salt of said diester of said sulfosuccinic acid having $C_8$ aliphatic ester groups is dioctyl sodium sulfosuccinate.

3. A method as defined by claim 1 wherein said alkali metal salt of said diester of said sulfosuccinic acid having $C_6$ aliphatic ester groups is dihexyl sodium sulfosuccinate.

4. A method as defined by claim 1 wherein said substituted polyethyleneoxyethanol is isooctylphenyl polyethyleneoxyethanol containing about 9 to 10 moles of ethylene oxide per mole of isooctyl phenol.

5. A method as defined by claim 1 wherein said solvent is a heavy aromatic naphtha.

6. A method for treating a subterranean oil-bearing formation surrounding a wellbore which comprises injecting into said formation through said wellbore a solvent containing from about 0.01 to about 5 percent by volume of a blend of from about 50 to about 70 percent by volume of dioctyl sodium sulfosuccinate, from about 20 to about 40 percent by volume of dihexyl sodium sufosuccinate, and from about 5 to about 20 percent by volume of nonylphenyl polyethyleneoxyethanol containing from about 9 to 10 moles of ethylene oxide per mole of nonyl phenol, and thereafter producting said solvent and connate fluids from said formation.

7. A method for treating a subterranean oil-bearing formation surrounding a wellbore which comprises injecting into said formation through said wellbore a solvent containing from about 0.01 to about 5 percent by volume of a blend of from about 50 to about 70 percent by volume of dioctyl sodium sulfosuccinate, from about 20 to 40 percent by volume of dihexyl sodium sulfosuccinate, and from about 5 to about 20 percent by volume of octylphenyl polyethyleneoxyethanol containing from about 9 to 10 moles of ethylene oxide per mole of octyl phenol, and thereafter producing said solvent and connate fluids from said formation.

8. A method for treating a subterranean formation surrounding a wellbore which comprises injecting into said formation through said wellbore a solvent containing from about 0.01 to about 5 percent by volume of a blend of from about 50 to about 70 percent by volume of dioctyl sodium sulfosuccinate, from about 20 to about 40 percent by volume of dihexyl sodium sulfosuccinate, and from about 5 to about 20 percent by volume of $C_{13}$ oxo polyethyleneoxyethanol containing 15 to 16 moles of ethylene oxide per mole of $C_{13}$ oxo alcohol, and thereafter producing said solvent and connate fluids from said formation.

9. A method for treating a water blocked well penetrating a subterranean oil-bearing formation which comprises injecting into said formation through said well an aromatic hydrocarbon containing from about 0.5 to about 2 percent by volume of a blend of about 60 percent by volume of dioctyl sodium sulfosuccinate, about 30 percent by volume of dihexyl sodium sulfosuccinate, and about 10 percent by volume of isooctylphenyl polyethyleneoxyethanol containing from about 9 to about 10 moles of ethylene oxide per mole of isooctyl phenol, and thereafter producing said hydrocarbon and connate fluids from said formation by backflowing said well.

10. A composition comprising a solvent containing from about 0.01 to about 5 percent by volume of a mixture of from about 50 to 70 percent by volume of an alkali metal salt of a diester of sulfosuccinic acid having $C_8$ aliphatic ester groups, from about 20 to 40 percent by volume of an alkali metal salt of a diester of sulfosuccinic acid having $C_6$ aliphatic ester groups, and from about 5 to 20 percent by volume of a long chain substituted polyethyleneoxyethanol having the formula

where R is an aliphatic group containing X carbon atoms, X is an integer from 7 to 21, Y is 0 or 1, Z is an integer from 6 to 28, and $0.475X - 0.33(Z+1) = 0.4$ to $1.4$.

11. A composition as defined by claim 10 wherein said salt of said diester having $C_8$ aliphatic ester groups is dioctyl sodium sulfosuccinate.

12. A composition as defined by claim 10 wherein said salt of said diester having $C_6$ aliphatic ester groups is dihexyl sodium sulfosuccinate.

13. A composition as defined by claim 10 wherein said substituted polyethyleneoxyethanol is isooctylphenyl polyethyleneoxyethanol containing about 9 to 10 moles of ethylene oxide per mole of isooctyl phenol.

14. A demulsifying agent containing as the active ingredients from about 50 to about 70 volume percent of dioctyl sodium sulfosuccinate, from about 20 to about 40 volume percent of dihexyl sodium sulfosuccinate, and from about 5 to about 20 volume percent of an alkylphenyl polyethyleneoxyethanol containing from about 7 to 21 carbon atoms in the alkyl group and having from about 6 to 28 ethyleneoxy groups, the relationship between the number of alkyl carbon atoms and the number of ethyleneoxy groups being defined by the equation $0.475X - 0.33(Z+1) = 0.4$ to $1.4$, where X is the number of alkyl carbon atoms and Z is the number of ethyleneoxy groups.

15. A demulsifying agent containing as the active ingredients from about 50 to about 70 volume percent of dioctyl sodium sulfosuccinate, from about 20 to 40 volume percent of dihexyl sodium sulfosuccinate, and from about 5 to 20 volume percent of isooctylphenyl polyethyleneoxyethanol containing from 9 to 10 moles of ethylene oxide per moles of isooctyl phenol.

16. A demulsifying agent containing as the active ingredients from about 50 to about 70 volume percent of dioctyl sodium sulfosuccinate, from about 20 to 40 volume percent of dihexyl sodium sulfosuccinate, and from about 5 to 20 volume percent of nonylphenyl polyethyleneoxyethanol containing from about 9 to 10 moles of ethylene oxide per mole of nonyl phenol.

17. A demulsifying agent containing as the active ingredients from about 50 to 70 volume percent of dioctyl sodium sulfosuccinate, from about 20 to 40 volume percent of dihexyl sodium sulfosuccinate, and from about 5 to 20 volume percent of $C_{13}$ oxo polyethyleneoxyethanol containing 15 to 16 moles of ethylene oxide per mole of $C_{13}$ oxo alcohol.

18. A demulsifying agent containing as the active ingredients about 60 volume percent of dioctyl sodium sulfosuccinate, about 30 volume percent of dihexyl sodium sulfosuccinate, and about 10 volume percent of isooctylphenyl polyethyleneoxyethanol containing from about 9 to 10 moles of ethylene oxide per mole of isooctyl phenol.

References Cited by the Examiner

UNITED STATES PATENTS 2,978,409   4/1961   Greenwald et al. ____ 252—8.55

CHARLES E. O'CONNELL, *Primary Examiner.*

JACOB L. NACKENOFF, *Examiner.*

N. C. BYERS, *Assistant Examiner.*